United States Patent
Chouinard et al.

(10) Patent No.: US 8,347,264 B2
(45) Date of Patent: Jan. 1, 2013

(54) METHOD AND SYSTEM FOR AN AUTOMATION COLLABORATIVE FRAMEWORK

(75) Inventors: Julien Chouinard, Magog (CA); Gilles Brunet, St-Hubert (CA); Denis Lavallee, St-Constant (CA); Chan-Dara Trang, Brossard (CA); Jean-Francois Laliberte, Boucherville (CA); Frédéric Darveau, St-Hubert (CA); Olivier Larouche, Boucherville (CA)

(73) Assignee: ICS Triplex Isagraf Inc., Brossard, Quebec (CA)

( * ) Notice: Subject to any disclaimer, the term of this patent is extended or adjusted under 35 U.S.C. 154(b) by 1128 days.

(21) Appl. No.: 12/242,316

(22) Filed: Sep. 30, 2008

(65) Prior Publication Data
US 2010/0083239 A1    Apr. 1, 2010

(51) Int. Cl.
*G06F 9/44* (2006.01)
(52) U.S. Cl. .................. 717/107; 717/104; 717/120
(58) Field of Classification Search ........... 717/100–123
See application file for complete search history.

(56) References Cited

U.S. PATENT DOCUMENTS

| | | | |
|---|---|---|---|
| 6,757,568 B2 | 6/2004 | Birzer et al. | |
| 6,981,226 B2 | 12/2005 | Schmitt et al. | |
| 7,024,665 B2 | 4/2006 | Ferraz et al. | |
| 7,117,043 B1 | 10/2006 | Frederick et al. | |
| 7,150,010 B1 | 12/2006 | Ringseth et al. | |
| 7,171,281 B2 | 1/2007 | Weber et al. | |
| 7,233,830 B1 | 6/2007 | Callaghan et al. | |
| 7,392,100 B1 | 6/2008 | Thomas et al. | |
| 7,424,329 B2 | 9/2008 | McKelvey et al. | |
| 7,480,709 B2 | 1/2009 | Callaghan | |
| 7,900,186 B2 * | 3/2011 | Lucassen et al. | 717/104 |
| 2002/0054099 A1 * | 5/2002 | Schmitt et al. | 345/762 |

OTHER PUBLICATIONS

Thramboulidis et al, "A Function Block Based Approach for the Development of Distributed IPMCS Applications", 2001, IEEE International Conference on Advanced Robotics (ICAR 2001), 6 pages.*
Tranoris et al., "From Requirement to Function Block Diagrams: A New Approach for the Design of Industrial Control Application", 2002, Proceedings of the 10th Mediterranean Conference on Control and Automation—MED2002, 10 pages.*
Chinese Office Action mailed Aug. 25, 2011 for corresponding CN application No. 200910177648.5, 8 pages.
European Search Report and Opinion mailed Feb. 14, 2011 for corresponding EP application No. 09171808.0, 8 pages.

* cited by examiner

*Primary Examiner* — Ted T Vo
(74) *Attorney, Agent, or Firm* — Turocy & Watson, LLP; Alexander R. Kuszewski; John M. Miller

(57) ABSTRACT

An automation collaborative framework (ACF) is provided. The ACF includes an abstract automated model (AAM) that defines a generic data management scheme. The AAM is extended so as to define an extended data management scheme according to control solutions received from a user. A concrete automation model (CAM) then implements a concrete data management scheme, in which the concrete data management scheme is derived as a function of the generic data management scheme and the extended data management scheme.

20 Claims, 17 Drawing Sheets

METHOD AND SYSTEM FOR AN AUTOMATION COLLABORATIVE FRAMEWORK

TECHNICAL FIELD

The claimed subject matter relates generally to industrial control systems and more particularly to a development platform for designing control solutions in an abstract setting.

BACKGROUND

Industrial control environments can typically involve complex mechanical, electronic, electromechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Modern control applications have become increasingly complicated. There are multiple development programs available to design software for applications that must in turn create executable code that is supported on diverse and different hardware platforms. In general, developers want to be able to offer new features to their end customers in a timely matter. If such development involves any type of customization from standard offerings provided by the development programs, the developers may be forced to request changes from OEM providers of the programs. Such requests can involve significant costs and threaten time to market. Accordingly, there is a need for a development platform that enables developers to design control solutions in a setting that efficiently facilitates code deployment and execution on different types of end hardware platforms.

SUMMARY OF THE INVENTION

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

A development platform is provided that employs generic programming models for designing control solutions in an abstract setting while facilitating code deployment and execution on a plurality of end hardware platforms. The development platform generates an Abstract Automation Model (AAM) which defines a data management scheme for managing generically defined data objects. As part of a larger framework or development environment, a Concrete Automation Model (CAM) provides data interfaces associated with the generic data objects of the AAM and according to a designated project format of differing development environments. For instance, various versions of a development program may have associated CAMs that link or map the respective versions to the underlying abstraction of the AAM. In another example, particular hardware vendors may provide a CAM for a particular type of programming interface that is unique to the respective vendor. By providing the abstraction of the AAM, and mapping to any particular nuance of differing program environments via the CAM, developers can rapidly add new features according to the generic programming model provided by the AAM, yet efficiently support and convert to substantially any available development program.

To the accomplishment of the foregoing and related ends, the following description and annexed drawings set forth in detail certain illustrative examples. These examples are indicative of but a few of the various ways in which the principles described herein may be employed. Other advantages and novel features may become apparent from the following detailed description when considered in conjunction with the drawings.

DETAILED DESCRIPTION OF THE INVENTION

A method and system for providing an automation collaborative framework (ACF) is disclosed. In one aspect, an AAM is generated such that the AAM defines an abstract data management scheme. The AAM is then extended so as to define an extended data management scheme according to control solutions received from a user. A CAM then implements a concrete data management scheme, in which the concrete data management scheme is derived as a function of the abstract data management scheme and the extended data management scheme.

Figure 1:
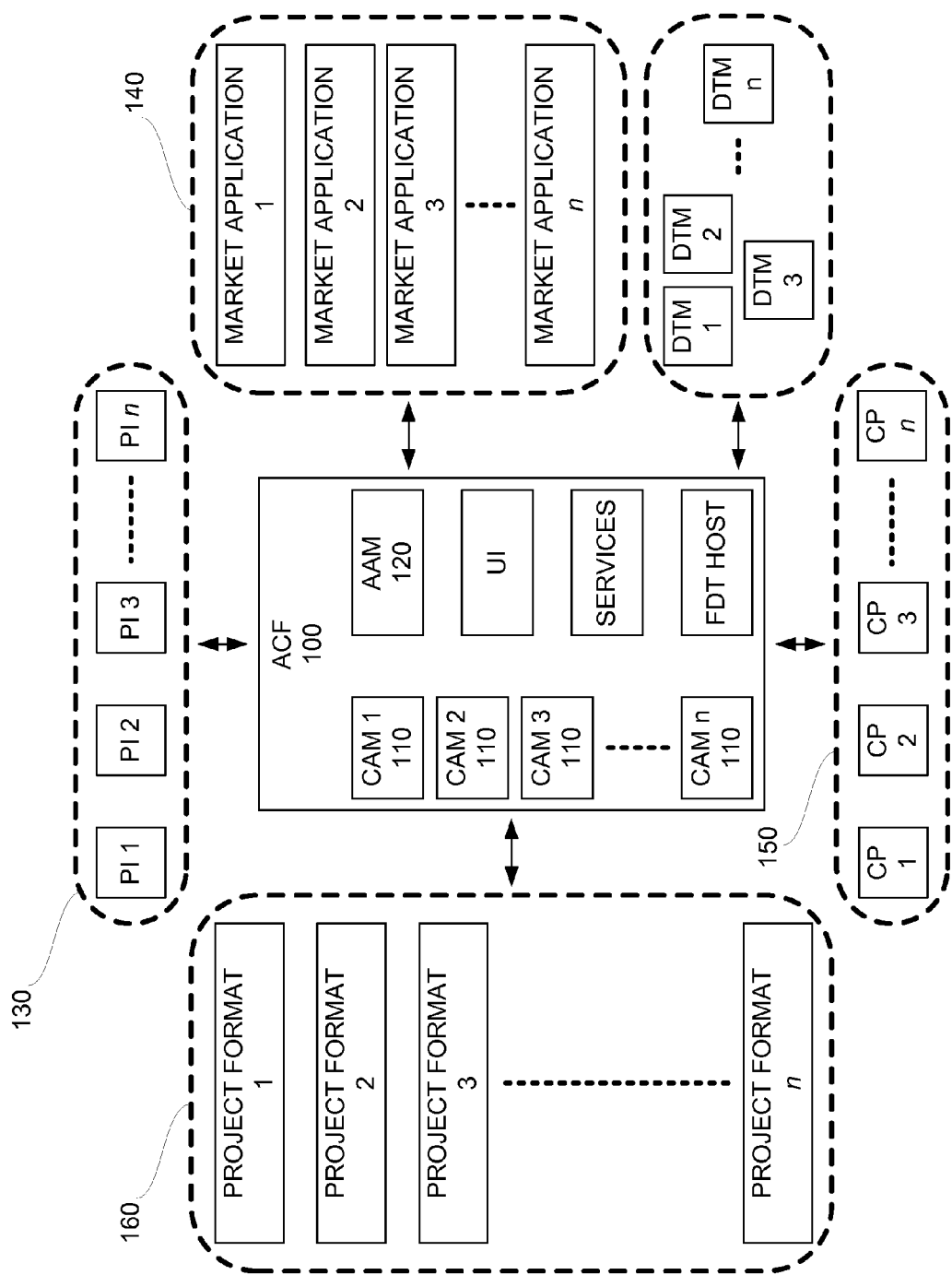
FIG. 1 is a high-level diagram of a preferred automation collaborative framework for programming control solutions.

Referring first to FIG. 1, a high-level diagram of a preferred ACF is provided. As illustrated, ACF 100 includes CAM generator 110 and AAM generator 120.

In one aspect, AAM generator 120 generates an AAM that allows control software design to occur transparently and outside of the particular revision or type of development software that is utilized. The AAM is the part of the ACF that describes how data is represented and accessed. Moreover, the AAM defines control structures that represent generic or abstract data objects having properties of a configuration, resource, program, and so forth. The AAM also defines integrity rules that ensure structural integrity, such as a tree structure, as well as operations to update or query data.

As illustrated, an AAM generated by AAM generator 120 may be configured to receive program commands developed in any of a plurality of project formats 160. Within such configuration, each project format 160 interfaces with a generated AAM via an associated CAM. Here, it should be appreciated that each of project formats 160 may represent a particular development program (e.g., ISaGRAF, RSLogix, SAMA, etc.), and a particular programming version (e.g., ISaGRAF v.1, ISaGRAF v.1, ISaGRAF v.1, etc.).

The AAM may also be configured to receive plug-in development support to increase the functionality of the AAM. Such configurations may include configurations which allow the AAM to receive any of a plurality of plug-ins 130 from various plug-in providers, including in-house and/or third-party developers. In-house developers may, for example, provide plug-ins that correspond to their particular project formats 160 (e.g., ISaGRAF plug-ins, which may include compiler and IEC Standards plug-ins), whereas third-party developers may simply provide generic plug-ins that do not necessarily correspond to a particular format 160 (e.g., configuration plug-ins, compiler plug-ins, alarm plug-ins, motion plug-ins, etc.).

In another aspect, the AAM may also be configured to support any of a plurality of market applications 140, which may be designed or pre-packaged for known industrial solutions. Such market applications 140 may, for example, include discrete solutions, motion control solutions, SCADA solutions, process solutions, robotics solutions, and functional safety management solutions.

It should be noted that an objective of the AAM is to unify automation project formats 160 around a single generic standard. As such, the AAM may be based on a standard that promotes interoperability by, for example, allowing data sharing and reuse between project formats 160. In one aspect, an AAM is derived from common base model solutions or standards such as IEC 61131 and 61499, for example. Although any programming standard can be utilized for the underlying model, IEC 61131 and 61499 support a majority of known automation languages in the world today.

In order to generate a particular AAM, AAM generator 120 may begin with a generic root AAM. Such a root AAM may, for example, include a generic representation of program organization units (POUs). POUs are commonly known as the blocks from which programs and projects are built. A particular PLC project may consist of POUs that are either shipped by the PLC manufacturer or created by the user. User programs can be used to build up libraries of tested POUs that can be used again in new projects. IEC 61131-3 supports this aspect of software re-use by stipulating that particular POU blocks have to remain "universal", i.e., hardware-independent, as far as possible.

Figure 2:
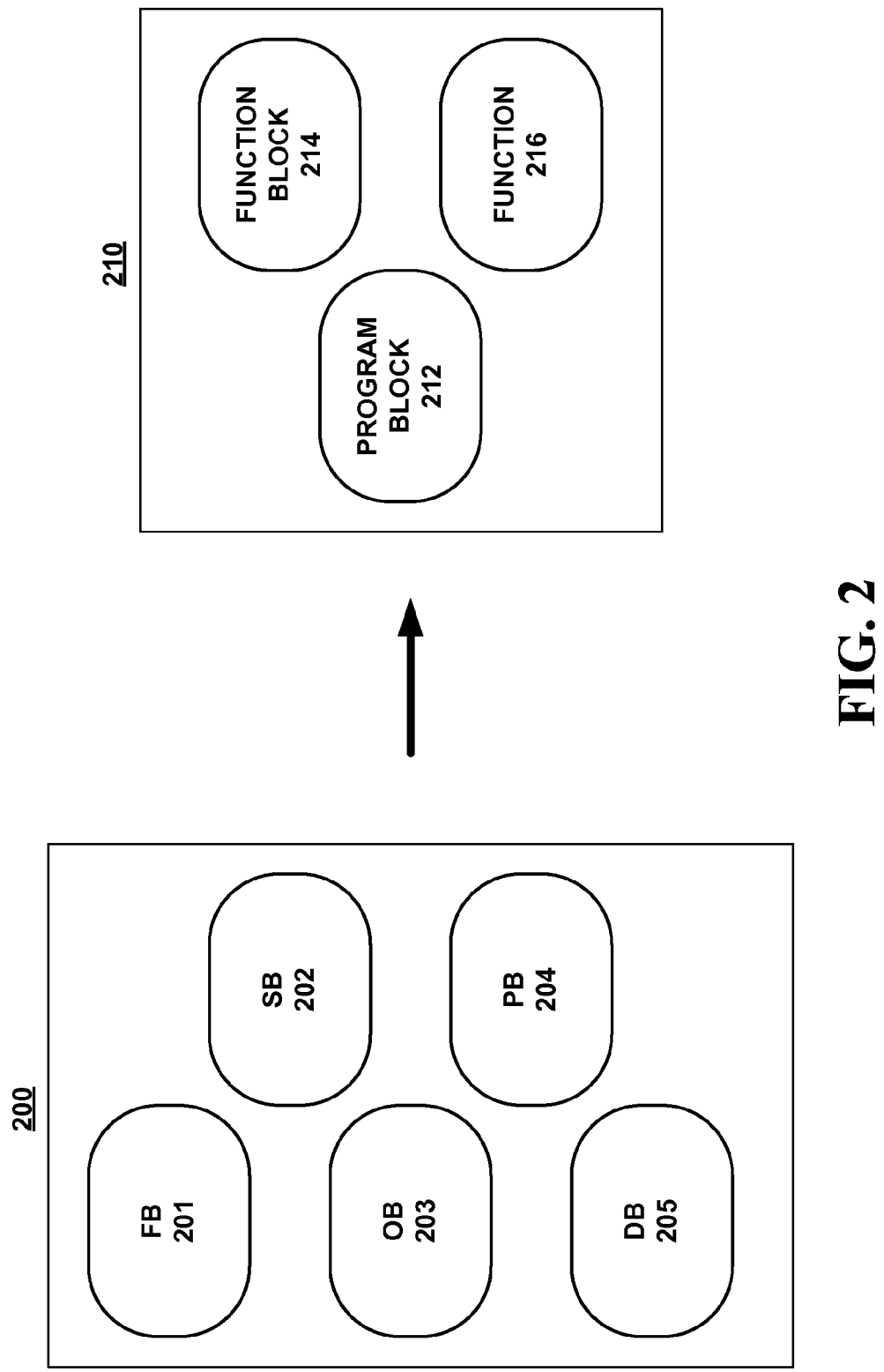
FIG. 2 is a diagram illustrating an AAM interfacing with a plurality of project formats via a plurality of CAMs.

By providing a generic representation of POUs, the variety and often implicit meanings of block types is restricted, which simplifies their usage. In FIG. 2, an exemplary diagram illustrating a generic representation of POU blocks is provided. For this particular example, the generic representation mirrors the IEC 61131-3 standard, which reduces the different block types of PLC manufacturers into three unified basic types. As illustrated, conventional PLC block types 200, which may include function blocks 201, sequence blocks 202, organization blocks 203, program blocks 204, and data blocks 205, are converted into generic block types 210, which may include function blocks 214, program blocks 212, and functions 216. Here, for consistency with the IEC 61131 standard, it should be noted that data blocks 205 may also be replaced by function block memories/instances or global multi-element variables.

In an aspect, function blocks 214 can be assigned parameters and may have static variables (i.e., may have memory). A function block 214, (e.g., a counter or timer block), when invoked with the same input parameters, will yield values which also depend on the state of its internal (VAR) and external (VAR_EXTERNAL) variables, which are preferably retained from one execution of the function block 214 to the next.

Program blocks 212 may then be modeled to represent the main program. All variables assigned to physical addresses (e.g., PLC inputs and outputs) may be declared in this POU or above it (e.g., Resource, Configuration). In all other respects, program blocks 212 may be modeled to operate like function blocks 214.

As for functions 216, these blocks may also be assigned parameters but, unlike function blocks 214, functions 216 might have no static variables (i.e., have no memory). Therefore, when invoked with the same input parameters, functions 216 yield the same result as its function value (i.e., its output). Moreover, functions 216 have input parameters and a function value as a return value, whereas program blocks 212 and function blocks 214 can have both input and output parameters.

It should also be noted that POUs, for these particular examples, are modeled as encapsulated units, which can be compiled independently of other program parts. Compiled POUs can be linked together later in order to create a complete program. Within such models, however, a set of integrity rules should be adopted. For example, in order to make the name of a POU known throughout a project, such rules may require that names be used only once. Local subroutines as in some other (high-level) languages might not be permitted. After programming a POU (declaration), its name and its calling interface may then be globally known to all other POUs in the project. The independence of POUs thus facilitates extensive modularization of automation tasks as well as the re-use of already implemented and tested software units.

Figure 3:
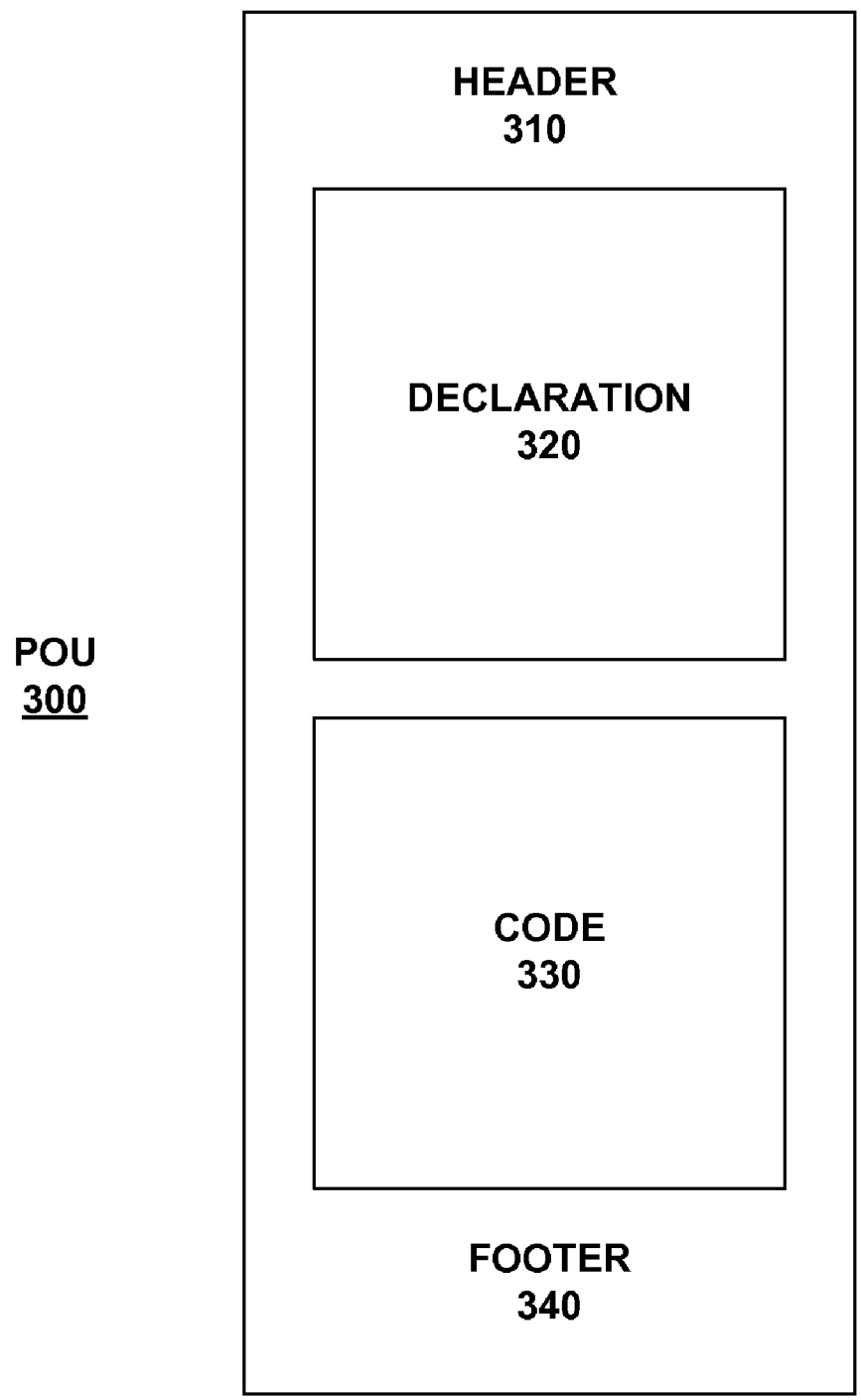
FIG. 3 is a diagram illustrating a generic categorization of program organizational unit blocks.

In FIG. 3, an exemplary diagram illustrating aspects of a generic POU block is provided. As illustrated, generic POU 400 may include header 410, declaration 420, code 430, and footer 440, as shown.

In an aspect, header 410 identifies the beginning of a POU, whereas footer 440 identifies the end of a POU. Header 410 may include information regarding the POU type and name. Such information may, for example, identify the POU as a program block 312 named MY_PROGRAM. If the POU is a function 316, header 410 may further include data type information.

In another aspect, all the variables used within POU 400 are defined in declarations 420. Within such aspect, declarations can be programmed in graphical or textual form. A distinction may also be made between variables visible from outside POU 400 (i.e., POU interface variables) and the local variables of POU 400. Moreover, the POU interfaces, as well as the local data area used in the POU, are preferably defined by assigning POU variables to variable types in declarations 420. The POU interface, for example, may include a calling/invocation interface (formal parameters), return values (output parameters or function return values), and a global interface (with global/external variables and access paths). In some aspects, graphical representations of the calling interface and the return values may be allowed so as to accommodate languages such as Ladder Diagram (LD) and Function Block Diagram (FBD).

The body of a POU may then be provided in code 430 which immediately follows declaration 420. Code 430 includes the instructions to be executed by the PLC, which may be provided in graphical or textual form. Such instructions may, for example, include a logical circuit or algorithm programmed in any of a plurality of programming languages, such as LD, FBD, Sequential Function Chart (SFC), Instruction List (IL), and Structured Text (ST).

Figure 4:
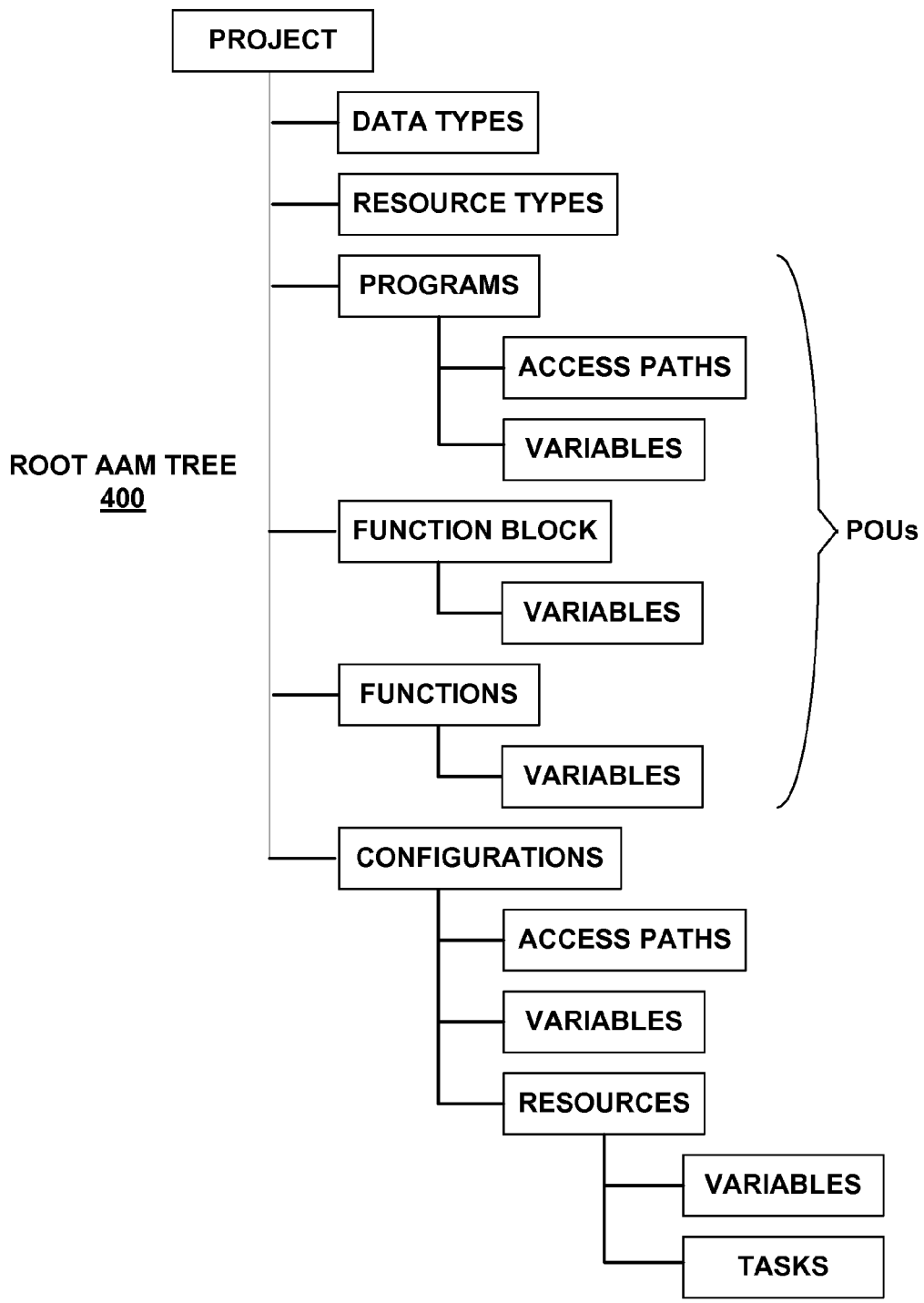
FIG. 4 is a diagram illustrating aspects of a generic program organizational unit block.

Data objects obtained from a user, such as POUs, may be organized according to a set of generic integrity rules. In FIG. 4, a diagram illustrating a generic root AAM tree according to an exemplary set of integrity rules is provided. As stated previously, an AAM may be derived from common base model solutions or standards such as IEC 61131 and 61499. For this particular example, root AAM tree 500 is derived from IEC 61131. As illustrated, the hierarchy of root AAM tree 500 may be organized as a set of directories and subdirectories. Data objects for a particular project may, for example, be stored into any of a plurality of directories including a Data Types directory, a Resource Types directory, a Programs directory, a Function Block directory, a Functions directory, or a Configurations directory. Each directory may then be further divided into a set of sub-directories, which may themselves be divided into further sub-directories.

Figure 5:
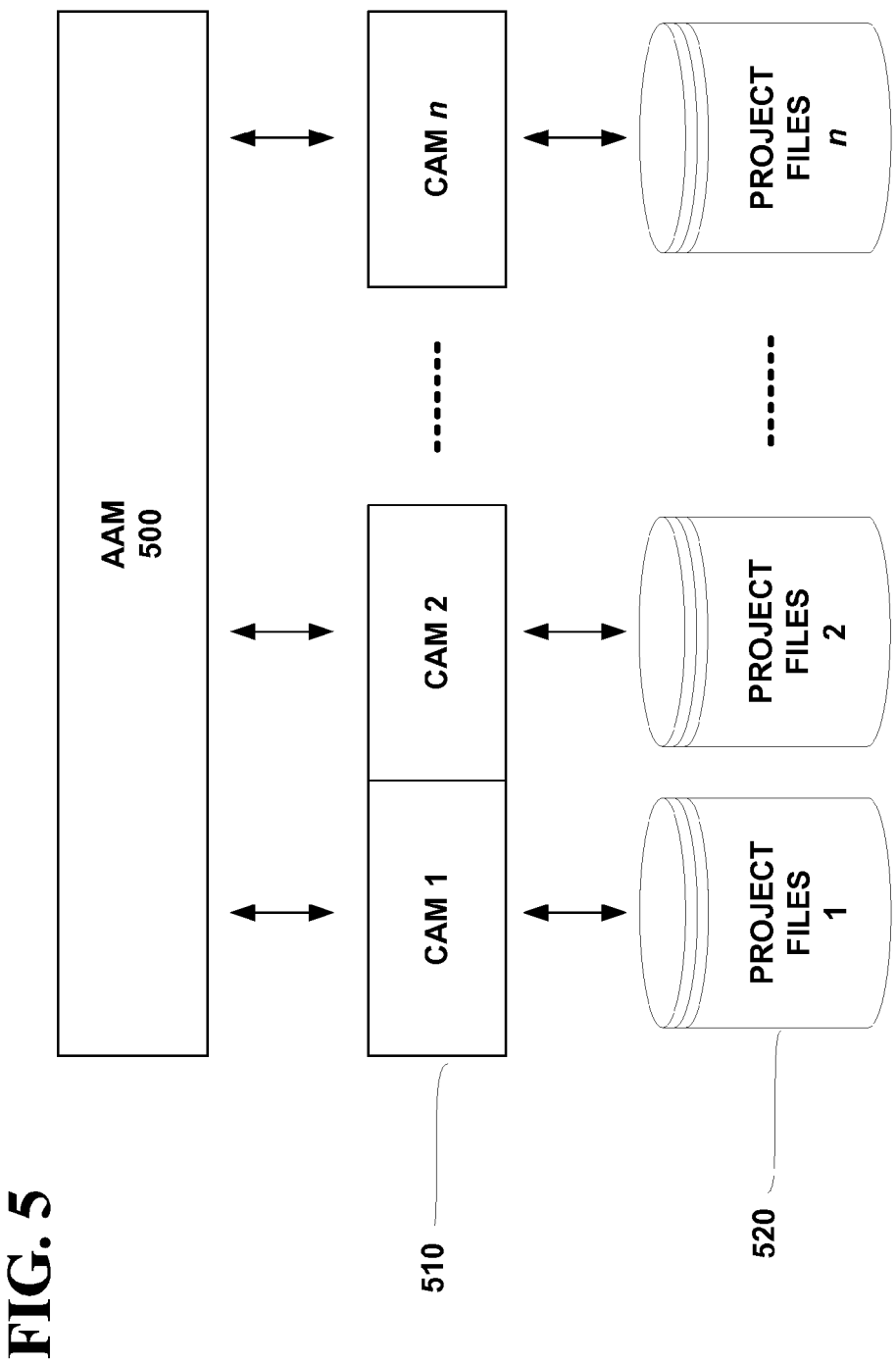
FIG. 5 is a diagram illustrating a generic integrity tree.

Referring next to FIG. 5, a diagram illustrating an exemplary function of a CAM is provided. For this particular example, AAM 200 interfaces with a plurality of project formats 220, via a plurality of CAMs 210, as shown. Within this example, each CAM 210 corresponds to a particular project format 220 and is the concrete instance of the AAM 200. In particular, each CAM 210 extends the root AAM according to the particular project format 220 associated with the CAM 210 and accordingly implements the appropriate data structures, integrity rules, and update/query operations. Moreover, each CAM 210 defines abstract interfaces to extend the AAM counterparts with CAM-specific data, and also defines concrete classes for implementing the CAM-specific interfaces. The interfaces defined in the AAM 200 are then concretely implemented by each CAM 210 to manage data according to the structure of the particular project format 220.

Figure 6:
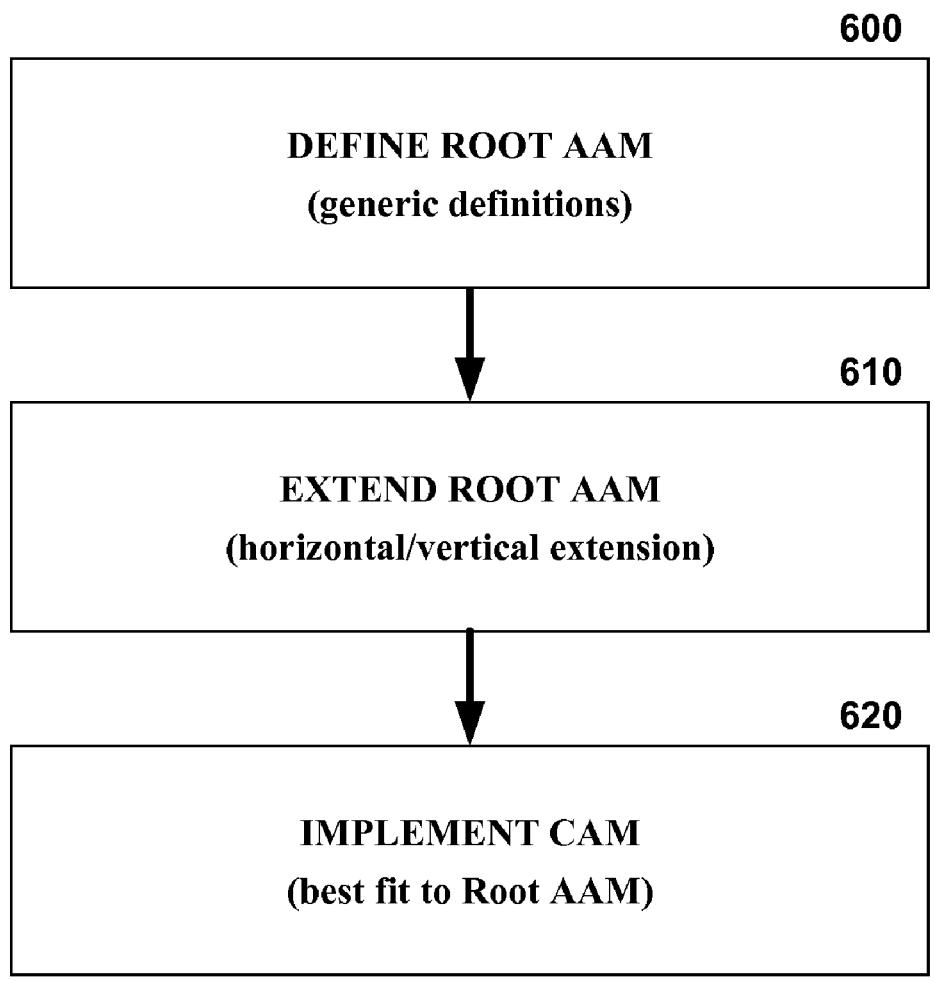
FIG. 6 is a flow diagram illustrating a methodology for generating a project format interface.

In FIG. 6, an exemplary flow diagram illustrating a methodology for generating a particular project format interface is provided. As illustrated, the process begins at step 600 where a root AAM is defined. As stated previously, such root AAM may include a plurality of generic definitions for data structures, integrity rules, and update/query operations.

At step 610, the process continues with an extension of the root AAM. In particular, the root AAM is extended to include project-specific definitions for additional data structures, integrity rules, and operations, which may have not been defined by the root AAM. Here, it should be noted that such extension could be horizontal or vertical. Horizontal extensions, for example, may include extending the AAM to integrate industrial applications such as those discussed with respect to market applications 140 in FIG. 1, whereas vertical extensions integrate particular project formats.

At step 620, the process concludes with the CAM implementing the appropriate AAM for the particular project format. Here, it should be appreciated that each CAM may make use of all or some of the extended AAM elements. To promote interoperability, each CAM may be configured to implement an AAM that is most similar to the root AAM.

Figure 7:
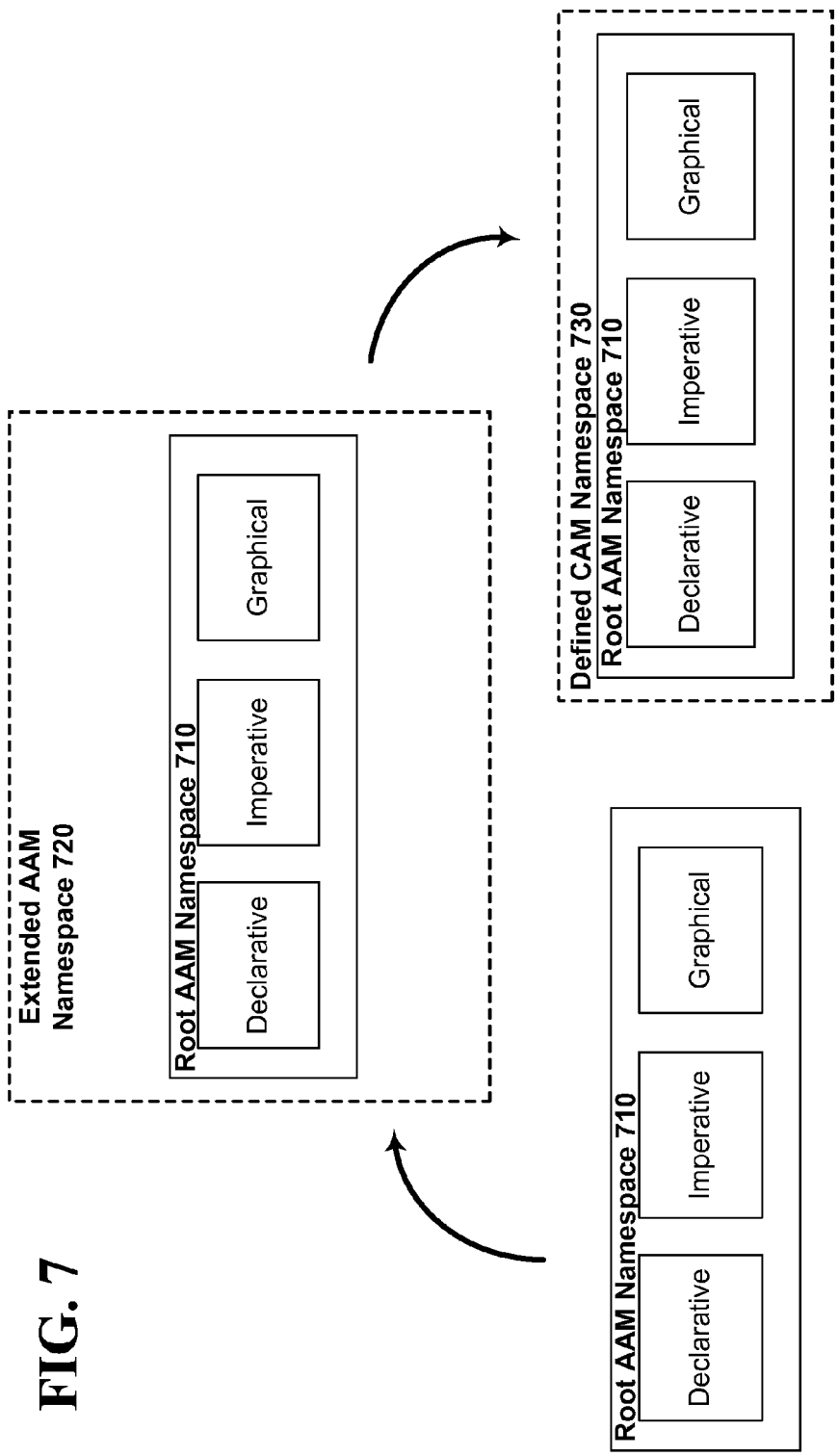
FIG. 7 is a block diagram illustrating an exemplary generation of a project-specific namespace.

In FIG. 7, a block diagram illustrating an exemplary generation of a project-specific namespace is provided. For this particular example, the process begins with a root namespace 710 in which data is categorized according to a set of generic classes. Such a root namespace 710, for example, may simply categorize data as declarative data, imperative data, or graphical data, as shown. Root namespace 710 may then evolve to become namespace 720, which extends root namespace 710 to include classes specific to a particular project format that may have not been defined by root namespace 710. The CAM will then concretely define an actual namespace 730 in which the CAM preferably limits the extent to which the root AAM namespace 710 is extended. Moreover, namespace 730 preferably includes only those classes defined by extended namespace 720 which are actually used.

Figure 8:
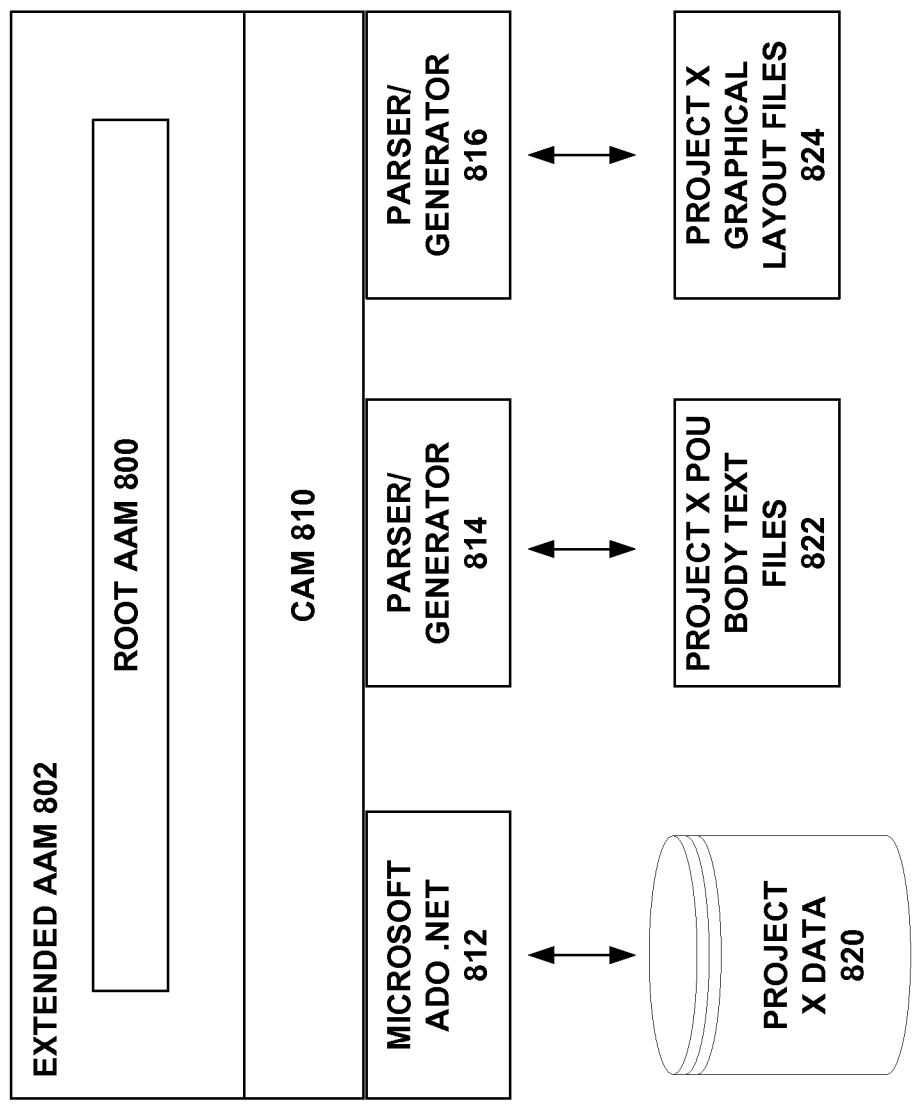
FIG. 8 is a diagram illustrating an extended abstract automation model interfacing with a particular project format via a concrete automation model.

In FIG. 8, an exemplary illustration of an AAM interfacing with a particular project format via a CAM is provided. Here, root AAM 800 is shown to be extended to AAM 802 so as to reflect any potential horizontal/vertical extensions. As illustrated, CAM 810 provides AAM 802 with an interface that allows data and files corresponding to a particular project format to be accessed. CAM 810 may, for example, provide an interface to access project data 820 via an appropriate ActiveX data object (ADO) configuration 812. CAM 810 may also provide an interface to access project-specific textual files 822 (e.g., POU body text files) via parser/generator 814, and project-specific graphical layout files 824 via parser/generator 816.

It should be appreciated that the underlying control models and features of the ACF may be exposed by designing particular development platforms. Such a platform may provide a familiar software design environment for users to create new features and functions. Indeed, because many control software development platforms exist as stand-alone entities that may require many years of development and testing before such platforms can be utilized, such platforms are often designed in an inflexible manner where newer versions of software paradigms and models are unsupported unless a new platform is designed to support such versions.

Figure 9:
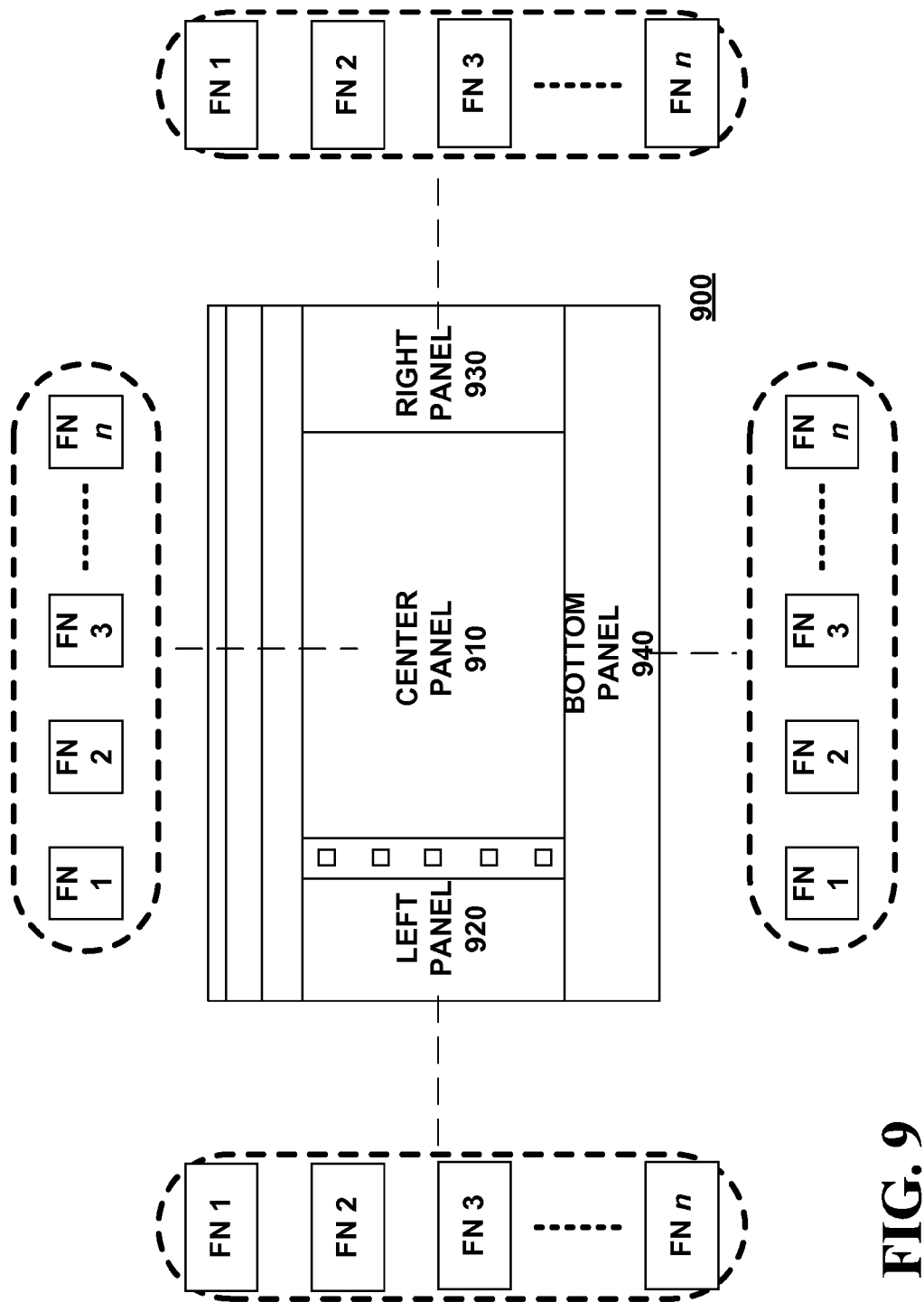
FIG. 9 is a high-level diagram of an exemplary design shell for a platform operable on an automation collaborative framework.

In FIG. 9, a high-level diagram of an exemplary design shell for a platform operable on an ACF is provided. Here, it should be appreciated that design shell 900 may be adapted with various technologies to support rapid software development for control and industrial automation platforms. As illustrated, shell 900 may include a center panel 910, left panel 920, right panel 930, and bottom panel 940, each of which may respectively include a plurality of functional/view features. Such features may, for example, include version control components, model editors, project control features, historical control features, libraries, properties and other templates for control solutions, debugging options. Various equipment and input/output views may also be provided which may facilitate a complete visualization of the software from the underlying source code to machine implementation. It should also be appreciated that, although shell 900 can be developed from available Windows technologies, shell 900 may be similarly constructed from UNIX, Java, Linux, and so forth. Moreover, shell 900 preferably provides an interface platform that is tailored to the particular needs of control systems designers.

Figure 10:
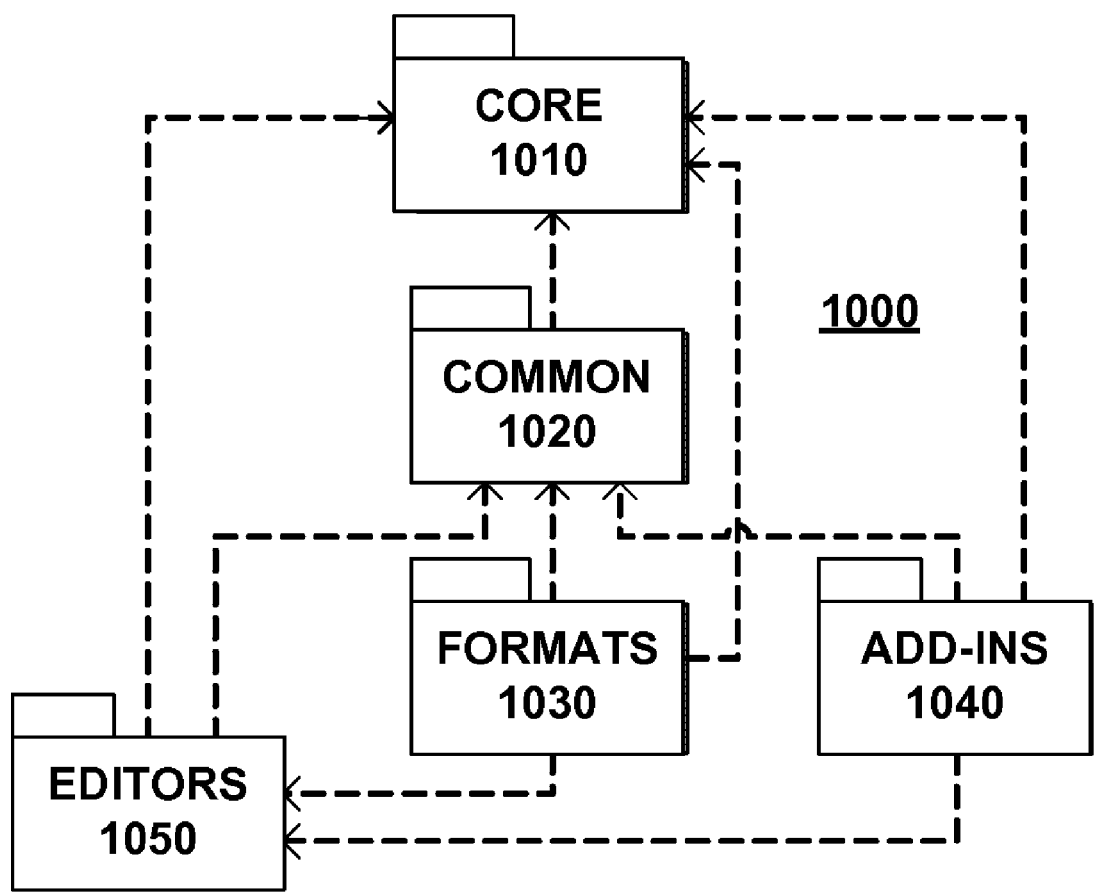
FIG. 10 is a block diagram illustrating exemplary architecture for a platform operable on an automation collaborative framework.

In FIG. 10, a block diagram illustrating exemplary architecture for a platform operable on an ACF is provided. As illustrated, the configuration of such architecture preferably allows the platform 1000 to first identify a core namespace 1010 and a common namespace 1020. Core 1010 preferably groups system-related reusable components such as a system logger, a rights manager and the shell, whereas common namespace 1020 preferably combines reusable data, services, and views. As illustrated, multiple project formats 1303 and add-ins 1040 may also be supported, as well as generalizations of visual studio editors 1050 to provide an easier interconnection of project format files and common views.

Figure 11:
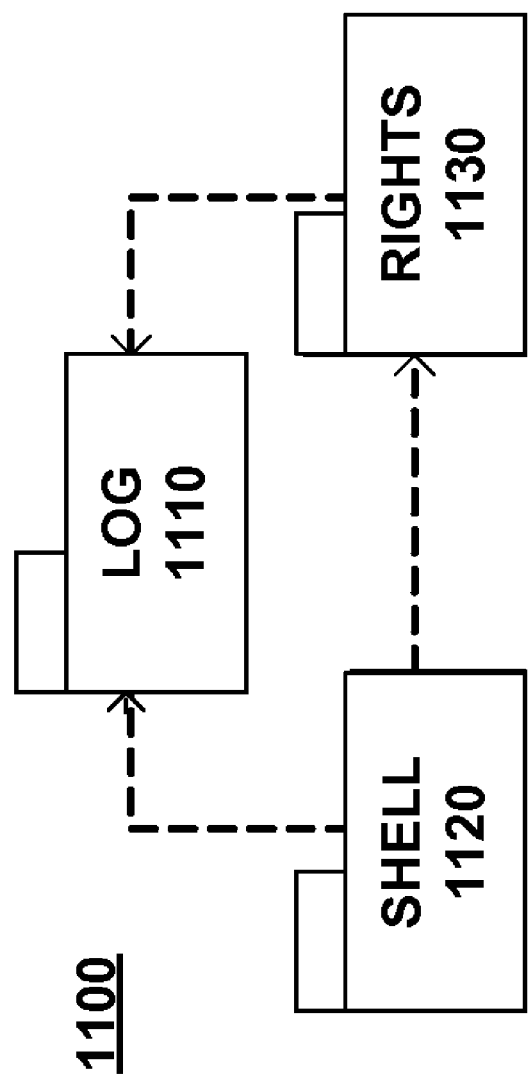
FIG. 11 is a high-level diagram of an exemplary core system for a platform operable on an automation collaborative framework.

Referring next to FIG. 11, a high-level diagram of an exemplary core log system is provided. As illustrated, such a system 1100 may include a log component 1110, a shell component 1120, and a rights component 1130, as shown. In one aspect, log component 1110 provides capabilities for recording events that may have impacted the underlying software system. Log component 1110 may, for example, be designed so that log statements remain in shipped code without incurring a high performance cost. Log filters may be configured to avoid logging events according to criteria such as Mapped Diagnostic Contexts (MDC), Nested Diagnostic Contexts (NDC), error level match, and so forth. New filter types may also be created to allow for more arbitrary filtering. The log framework preferably writes log events to multiple outputs, such as a database, a remote sink using .NET remoting, a web service, a plane text file (with or without multiplexing), and so forth. New target types may then be created to redirect events in some other outputs. The framework also preferably supports hierarchical logging.

Figure 12:
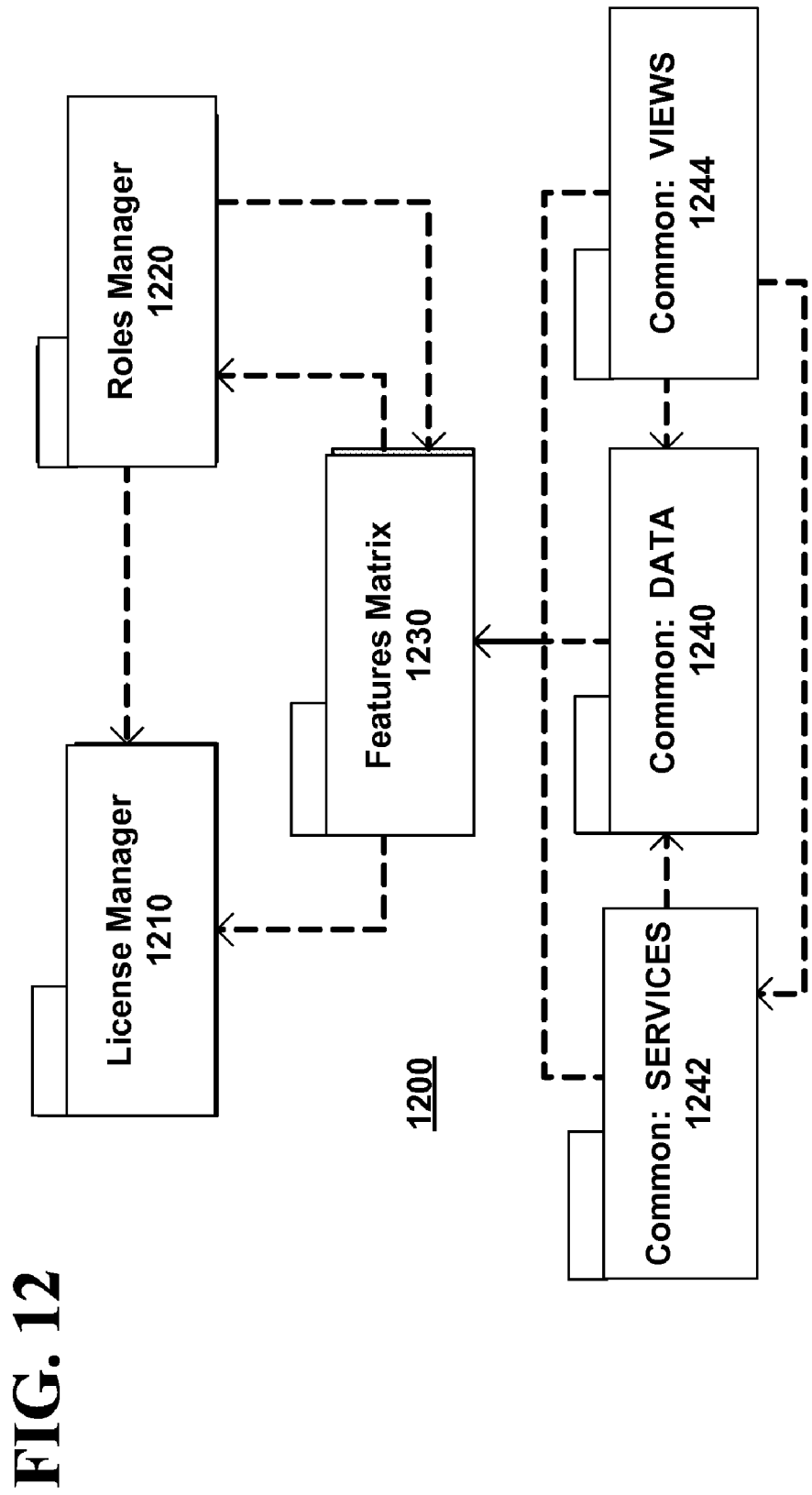
FIG. 12 is a high-level diagram of an exemplary architectural scheme for supporting system rights on a platform operable on an automation collaborative framework.

Referring next to FIG. 12, a high-level diagram of a scheme for supporting system rights is provided. Within such scheme 1200, a license manager 1210 preferably enables designers to control intellectual property access (e.g., code module access) within a given control solution. In an aspect, the license manager 1210 may include a license editor to display feature permissions and constraints. A roles manager 1220 is also preferably provided to allow developers to control access to model features based on an end user's role (e.g., manager, technician) within an organization. Within such aspect, a roles editor may be provided to define roles for respective software features of the deployed control solution.

As illustrated, a features matrix 1230 may also be coupled to license manager 1210 and roles manager 1220. In one aspect, features matrix 1230 functions as a decision table that dynamically enables/disables, shows/hides, and checks/unchecks various features. Feature matrix 1230 preferably maps all features on root access permission objects, wherein the structure of the feature may extend the permission object. Such extension may, for example, add a combination of any the three following command status flags: Enabled/Disabled; Visible/Hidden; and Checked/Unchecked.

In another aspect, feature matrix 1230 creates a permission set for each feature declared by loaded modules 1240, 1242, and 1244. At the initial feature declaration, for example, feature matrix 1230 retrieves the feature status from the license provider. The permission set then aggregates license, user-role or element status permission objects. In some aspects, any module, project format, or add-in can register additional permission objects to this set. Any unknown feature name may be considered "custom," wherein features matrix 1230 assumes they are enabled. In such cases, the licensing validation is under the control of this extension, whereby the permission set is used by a standard command update handler and licensed methods. A licensed method then invokes the permission's "Demand" method, which raises a security exception when the command status is not "Enabled."

It should be noted that a field-bus component (not shown) may also be included so as to provide a common API to manage dialog, download, upload and on-line changes with control system target platforms. If included, the API design may be extensible to support any automation protocol.

Figure 13:
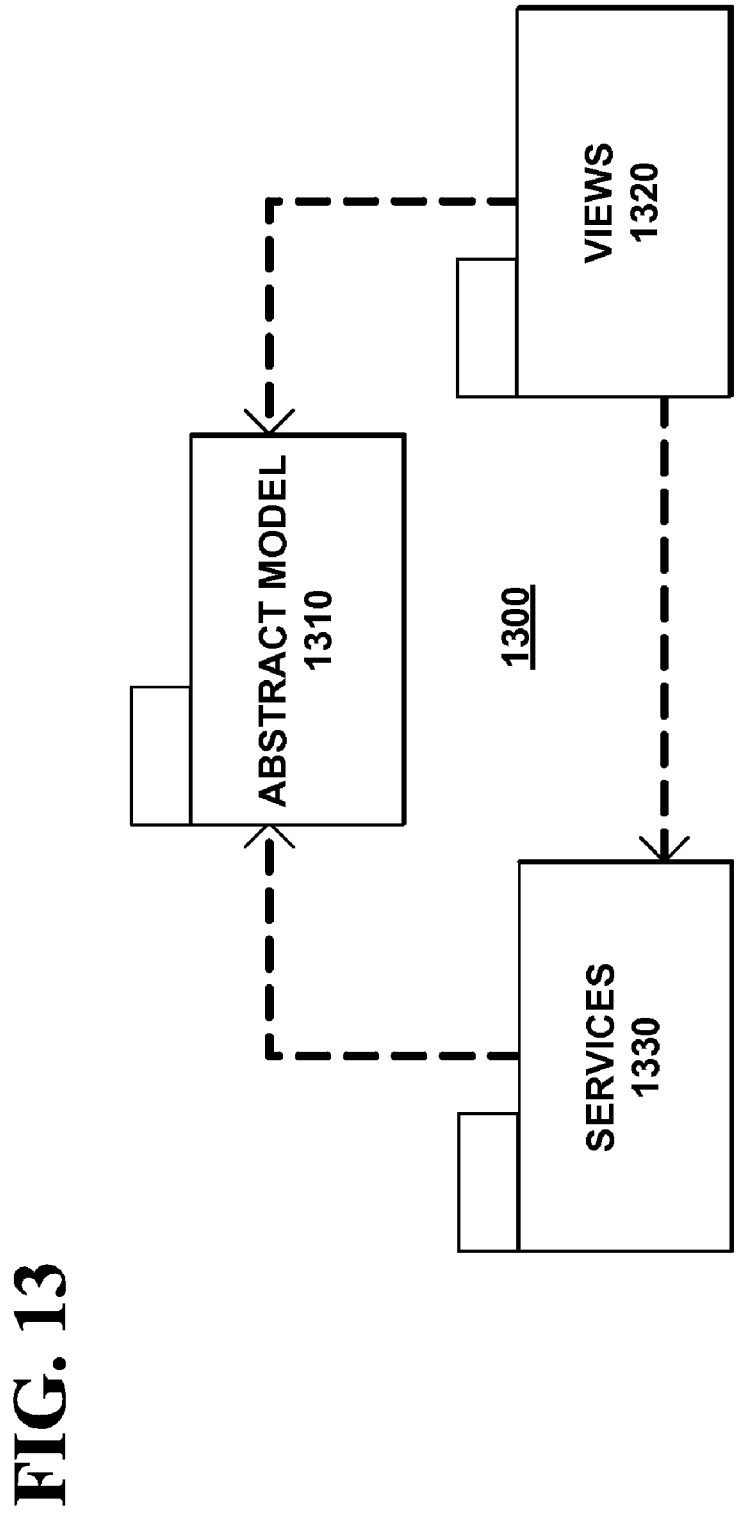
FIG. 13 is an exemplary illustration of how an abstract model may be integrated into the framework of a platform operable on an automation collaborative framework.

FIG. 13 is an exemplary illustration of how an abstract model may be integrated into a platform operable on an automated collaboration framework. Within such a scheme 1300, the abstract model 1310 preferably captures the automation domain's commonly used data structures. Abstract model 1310 may, for example, group programming interfaces, where each interface reflects a possible aspect that could be exposed in data of an automation project. For this particular example, services 1330 are processing units that use or change data exposed by the abstract model, whereas views 1320 are user interface controls for presenting data to a user. Data exposed by the abstract model is then used or changed using data abstract interfaces or indirectly through services 1330.

Figure 14:
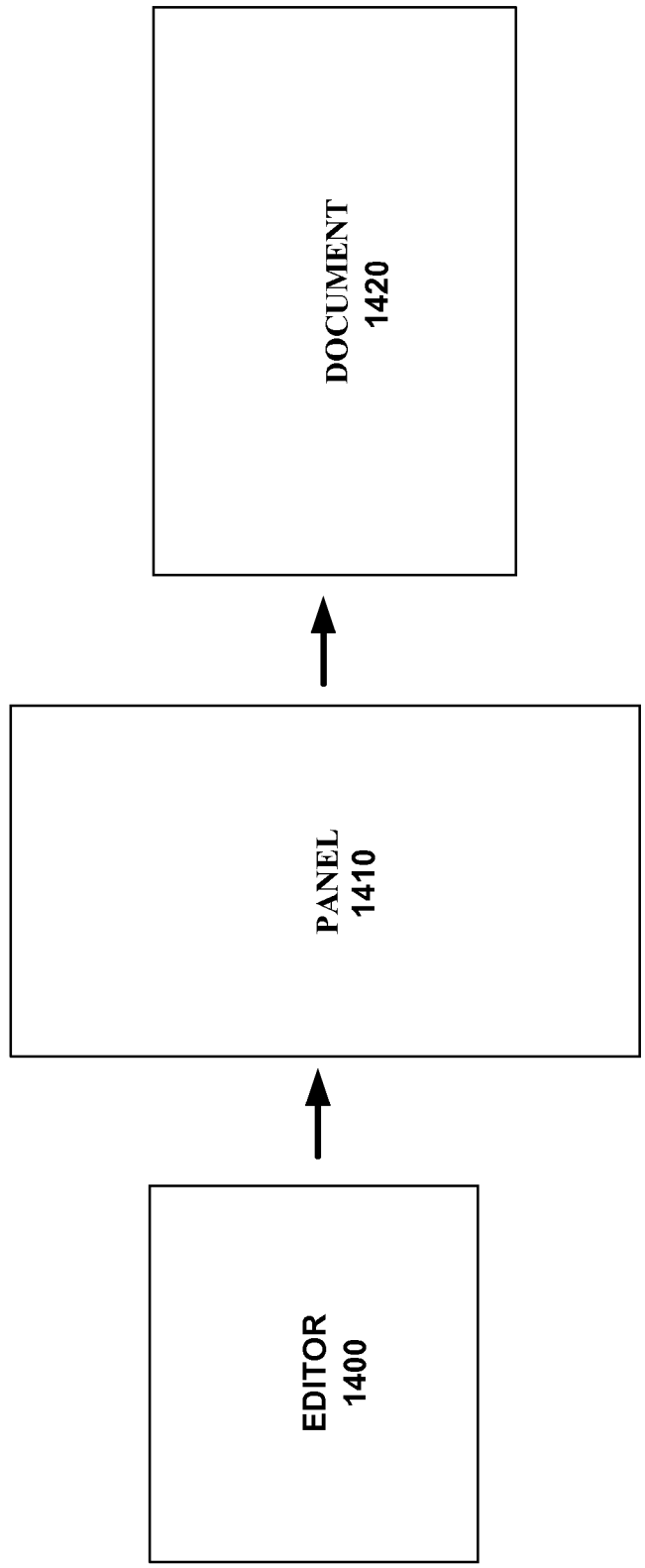
FIG. 14 is a block diagram illustrating an exemplary operation of a multi-language editor supported by an automation collaborative framework.

It should be noted that, because development packages for modern control systems are expected to operate with various and sometimes divergent control systems languages, mixing languages within a given platform may be problematic when large applications are constructed. In an aspect, the ACF may facilitate a multi-language editor that allows creation of custom shapes that define new control functions or relationships within a control systems solution. In FIG. 14, a block diagram illustrating an exemplary operation for such a multi-language editor is provided. As illustrated, an editor 1400 may be used in conjunction with a control panel 1410 so as to produce a particular multi-language document 1420. Editor 1400 may, for example, be a stencil editor that allows customers to define their own shapes to create underlying control solutions. Such a stencil editor may be configured so that a custom shape operates as a macro function that is a collection of other functions selected to define a particular control solution. In an aspect, panel 1410 may then be used to change display types, (e.g., windows style: Details, Icons with tool tips . . . ), support drag and drop operations, provide scalable panes, and sort icons (where each stencil may have its own container shape). Panel 1410 may also be used to import new stencils based on library hardware (XML), and allow OEMs to create their own stencils with their own shapes.

It should be further noted that some software development programs compile high-level control languages such as LD and SFC down to target system operating instructions. Often, the compilation is a compilation of higher level source code that has been translated to PLC target code such as C+ source code that is compiled to C+ executable format. A problem with such a compilation scheme is the inflexibility of many systems to support more than one type of high-level language compilation. Execution performance is also a problem since compilation at the target level is often inefficient and far removed from the actual target hardware language (which is the form of the highest possible execution format).

The ACF described herein provides a framework for developing a compilation model that overcomes these limitations. In particular, the ACF provides a framework for creating a compilation model that reduces the amount of code required to implement a higher-level control solution, which increases code execution performance.

Figure 15:
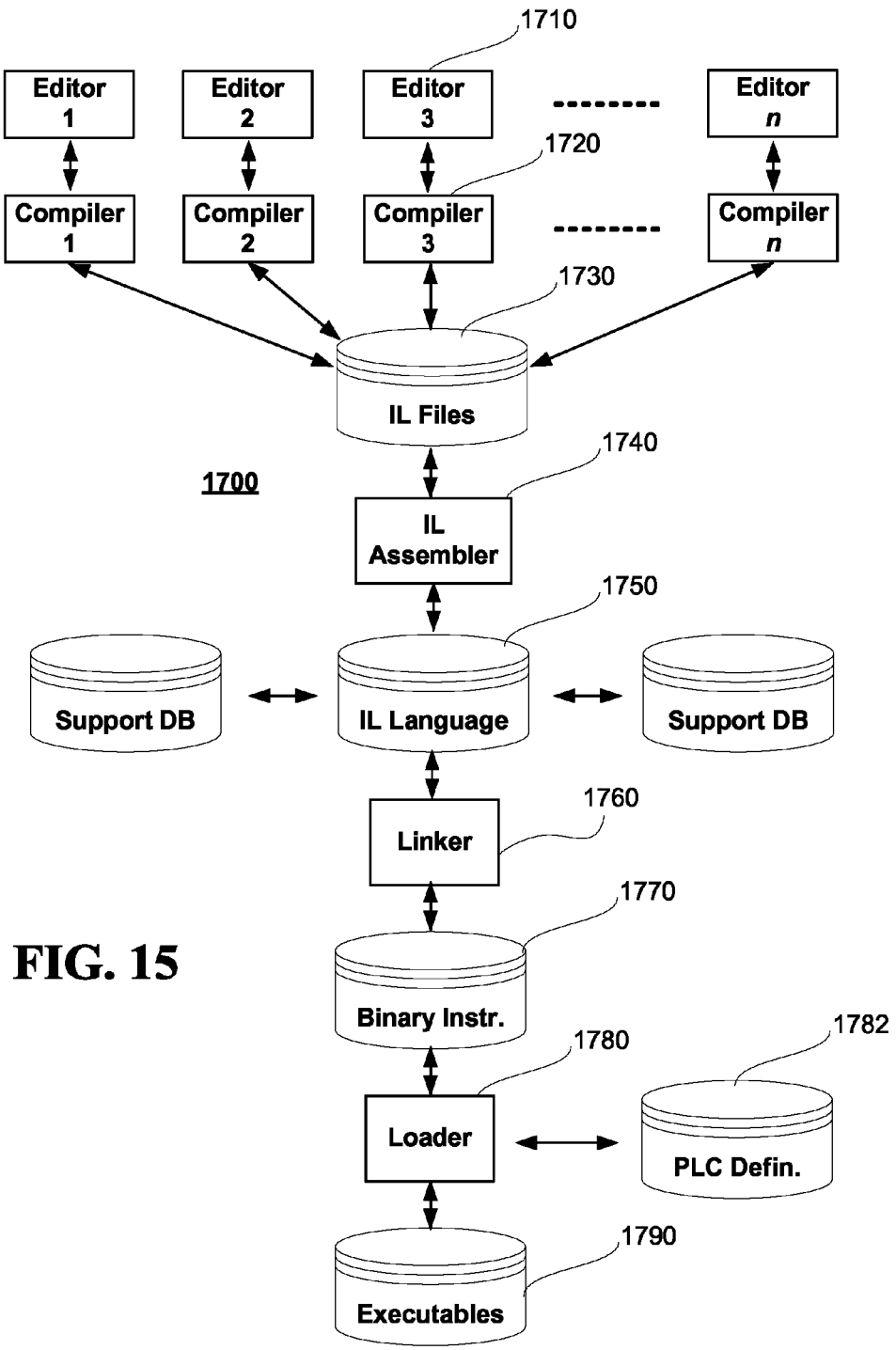
FIG. 15 is a high-level diagram of an exemplary compilation model operable on an automation collaborative framework.

In FIG. 15, a high-level diagram of an exemplary compilation model operable on an ACF is provided. Within such a model 1700, any of a plurality of editors 1710 supporting various languages can be employed (e.g., LD editors, SFC editors, FBD editors, etc.). The output from each of editors 1710 is then respectively compiled by compilers 1720 to an Intermediate Language (IL) language and stored as IL Files 1730. An IL assembler 1740 then takes these files and stores them in an IL language database 1750. Contents of the IL language database 1750 are then linked, via linker 1760, to a binary format 1770 of high-performance instructions that are supported by most target microprocessors. A loader 1780, which is coupled to binary database 1770, PLC definitions database 1782, and target executable code database 1790, then converts this binary code into the appropriate target executable code. Specifically, database 1782 provides loader 1780 with a particular PLC definition that defines the desired end user hardware environment. Loader then 1780 then converts the binary source code, in view of the actual PLC hardware constraint described in the PLC definition, into the appropriate target executable code.

It is noted that as used in this application, terms such as "component," "module," "batch," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

One of ordinary skill in the art can appreciate that the various aspects for an ACF described herein can be implemented in connection with any computer or other client or server device, which can be deployed as part of a computer network or in a distributed computing environment, and can be connected to any kind of data store. In this regard, the various aspects described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various aspects of the subject disclosure.

Figure 16:
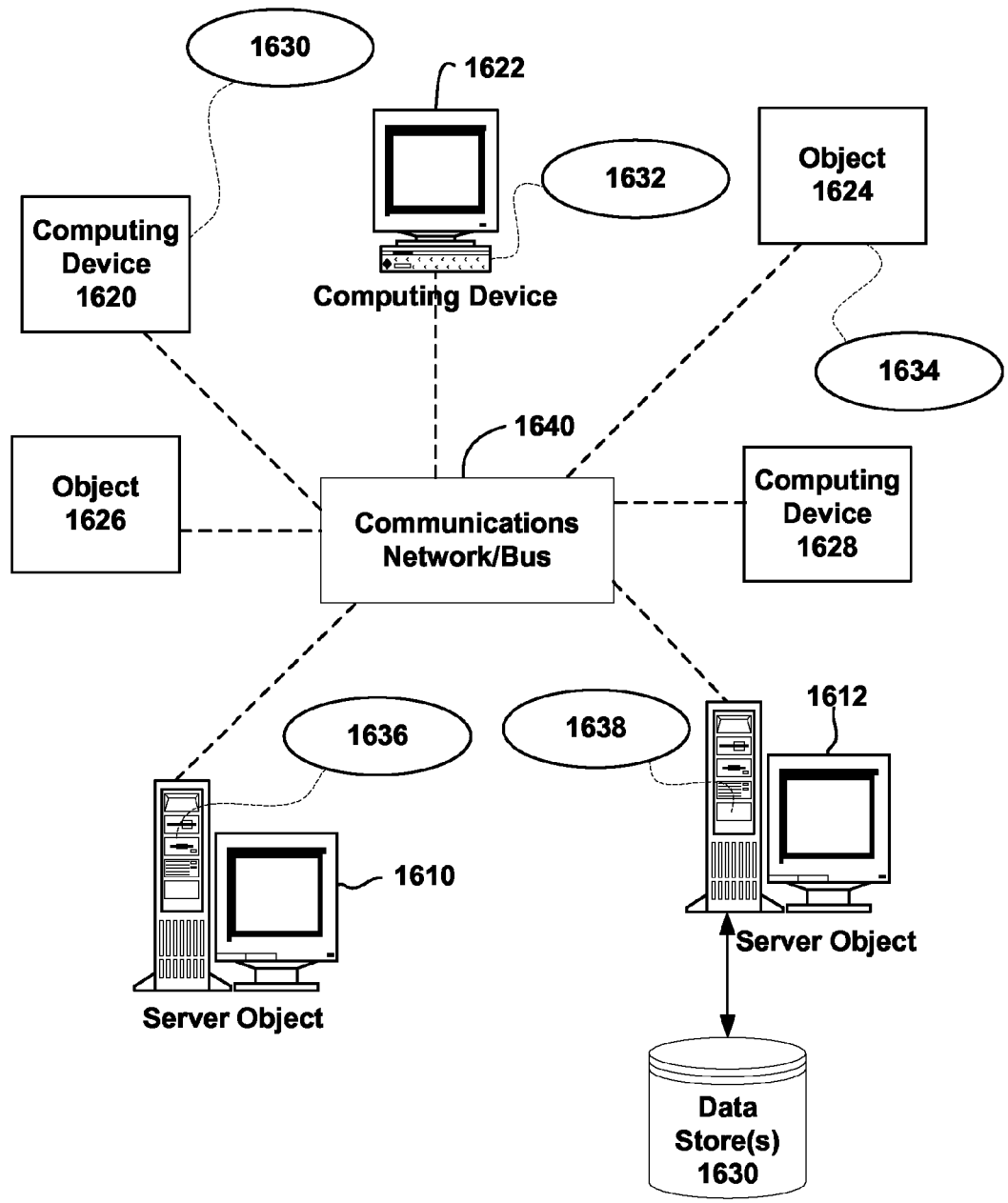
FIG. 16 is a block diagram representing exemplary non-limiting networked environments in which various aspects described herein can be implemented.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638. It can be appreciated that objects 1610, 1612, etc. and computing objects or devices 1620, 1622, 1624, 1626, 1628, etc. may comprise different devices, such as PDAs, audio/video devices, mobile phones, MP3 players, personal computers, laptops, etc.

Each object 1610, 1612, etc. and computing objects or devices 1620, 1622, 1624, 1626, 1628, etc. can communicate with one or more other objects 1610, 1612, etc. and computing objects or devices 1620, 1622, 1624, 1626, 1628, etc. by way of the communications network 1640, either directly or indirectly. Even though illustrated as a single element in FIG. 16, network 1640 may comprise other computing objects and computing devices that provide services to the system of FIG. 16, and/or may represent multiple interconnected networks, which are not shown. Each object 1610, 1612, etc. or 1620, 1622, 1624, 1626, 1628, etc. can also contain an application, such as applications 1630, 1632, 1634, 1636, 1638, that might make use of an API, or other object, software, firmware and/or hardware, suitable for communication with, processing for, or implementation of the column based encoding and query processing provided in accordance with various aspects of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the column based encoding and query processing as described in various aspects.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computers 1620, 1622, 1624, 1626, 1628, etc. can be thought of as clients and computers 1610, 1612, etc. can be thought of as servers where servers 1610, 1612, etc. provide data services, such as receiving data from client computers 1620, 1622, 1624, 1626, 1628, etc., storing of data, processing of data, transmitting data to client computers 1620, 1622, 1624, 1626, 1628, etc., although any computer can be considered a client, a server, or both, depending on the circumstances. Any of these computing devices may be processing data, encoding data, querying data or requesting services or tasks that may implicate the column based encoding and query processing as described herein for one or more aspects.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the column based encoding and query processing can be provided standalone, or distributed across multiple computing devices or objects.

In a network environment in which the communications network/bus 1640 is the Internet, for example, the servers 1610, 1612, etc. can be Web servers with which the clients 1620, 1622, 1624, 1626, 1628, etc. communicate via any of a number of known protocols, such as the hypertext transfer protocol (HTTP). Servers 1610, 1612, etc. may also serve as clients 1620, 1622, 1624, 1626, 1628, etc., as may be characteristic of a distributed computing environment.

As mentioned, advantageously, the techniques described herein can be applied to any device where it is desirable to query large amounts of data quickly. It should be understood, therefore, that handheld, portable and other computing devices and computing objects of all kinds are contemplated for use in connection with the various aspects, i.e., anywhere that a device may wish to scan or process huge amounts of data for fast and efficient results. Accordingly, the below general purpose remote computer described below in FIG. 17 is but one example of a computing device.

Although not required, aspects can partly be implemented via an operating system, for use by a developer of services for a device or object, and/or included within application software that operates to perform one or more functional aspects of the various aspects described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 17:
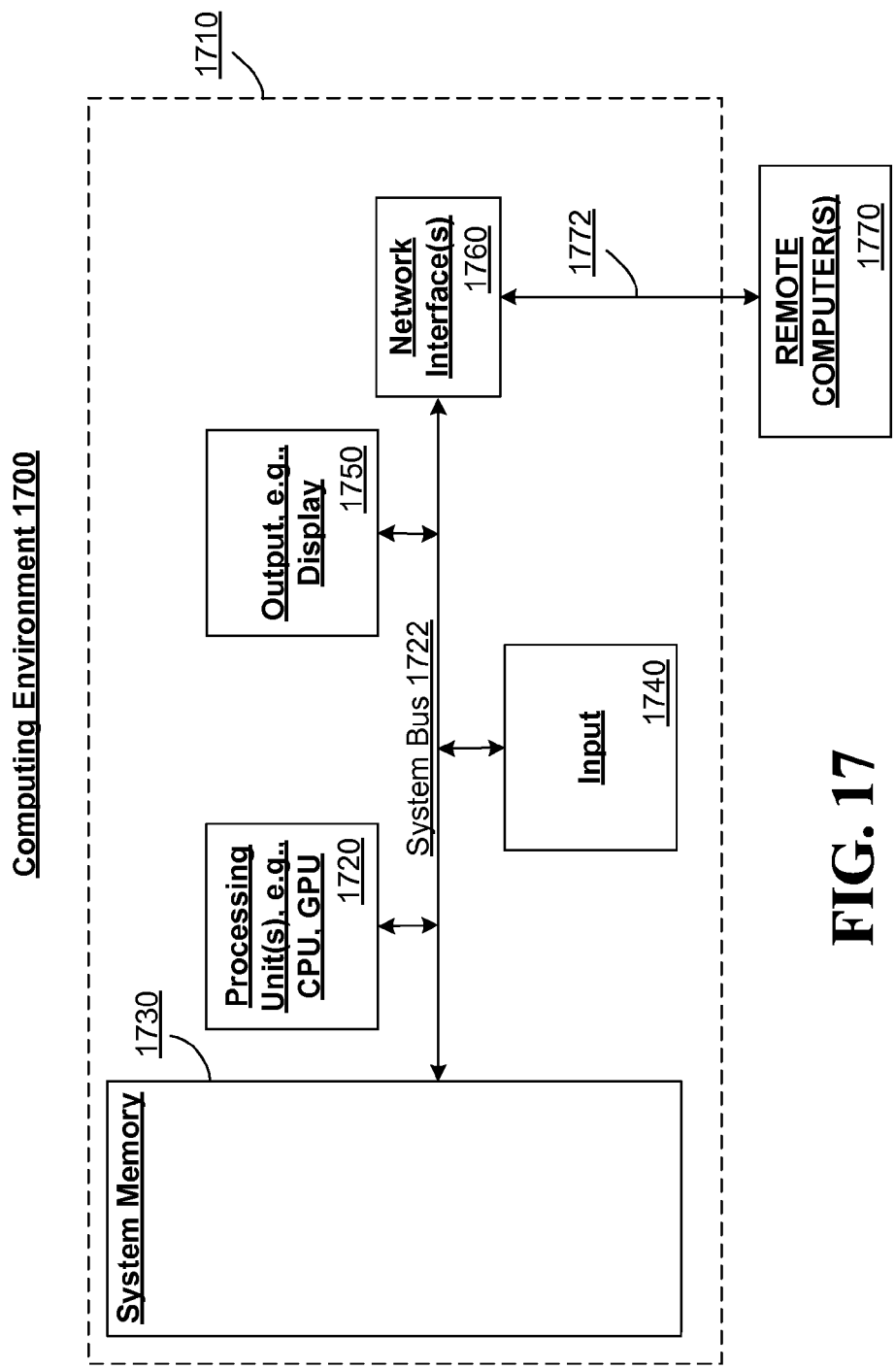
FIG. 17 is block diagram representing an exemplary non-limiting computing system or operating environment in which one or more examples of various aspects described herein can be implemented.

FIG. 17 thus illustrates an example of a suitable computing system environment 1700 in which one or aspects described herein can be implemented, although as made clear above, the computing system environment 1700 is only one example of a suitable computing environment and is not intended to suggest any limitation as to scope of use or functionality. Neither should the computing environment 1700 be interpreted as having any dependency or requirement relating to any one or combination of components illustrated in the exemplary operating environment 1700.

With reference to FIG. 17, an exemplary remote device for implementing one or more aspects includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, memory 1730 may also include an operating system, application programs, other program modules, and program data.

A user can enter commands and information into the computer 1710 through input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such local area network (LAN) or a wide area network (WAN), but may also include other networks/buses. Such networking environments are commonplace in homes, offices, enterprise-wide computer networks, intranets and the Internet.

As mentioned above, while exemplary aspects have been described in connection with various computing devices and network architectures, the underlying concepts may be applied to any network system and any computing device or system in which it is desirable to compress large scale data or process queries over large scale data.

Also, there are multiple ways to implement the same or similar functionality, e.g., an appropriate API, tool kit, driver code, operating system, control, standalone or downloadable software object, etc. which enables applications and services to use the efficient encoding and querying techniques. Thus, aspects herein are contemplated from the standpoint of an API (or other software object), as well as from a software or hardware object that provides column based encoding and/or query processing. Thus, various embodiments described herein can have aspects that are wholly in hardware, partly in hardware and partly in software, as well as in software.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for providing an automation collaborative framework, comprising:
    employing a processor executing computer executable instructions embodied on at least one non-transitory computer readable medium to perform operations comprising:
        generating an abstract automation model, where the abstract automation model defines an abstract data management scheme comprising a plurality of generic data objects; and linking a plurality of concrete automation models to the abstract automation model, wherein each of the plurality of concrete automation models are respectively generated from vendor specific programming interface of a plurality of vendor specific programming interfaces, wherein the respective concrete automation models provide data interfaces from vendor specific programming data objects to generic data objects of the abstract automation model.

2. The method of claim 1, further comprising extending the abstract automation model to include an extended data management scheme comprising a plurality of market application specific project formats.

3. The method of claim 1, wherein a concrete automation model employs elements from multiple market application specific project formats.

4. The method of claim 1, wherein the generic data objects comprise declarative data objects, imperative data objects, and graphical data objects.

5. The method of claim 1, further comprising generating a feature matrix for dynamically enabling, disabling, showing, and hiding elements of the abstract automation model and concrete automation models according to licensing permissions.

6. The method of claim 1, further comprising providing a stencil editor for defining a custom shape that comprises a collection of a plurality of functions of the abstract automation model or concrete automation models.

7. The method of claim 6, where the stencil editor imports custom shapes.

8. The method of claim 6, where the plurality of functions are programmed in a plurality of control system languages.

9. The method of claim 1, where the abstract automation model defines a set of operations for querying and updating the generic data objects.

10. The method of claim 1, further comprising facilitating at least one code execution.

11. A system for providing an automation collaborative framework, comprising:
a processor;
a memory communicatively coupled to processor, the memory having stored therein computer-executable instructions, comprising:
an abstract automated model defining an abstract data management scheme comprising a plurality of generic data objects; and
a plurality of concrete automated models linked to the abstract automation model, wherein each of the plurality of CAMs are respectively generated from vendor specific programming interface of a plurality of vendor specific programming interfaces, wherein the respective concrete automation models provide data interfaces from vendor specific programming data objects to generic data objects of the abstract automation model.

12. The system of claim 11, wherein the abstract automation model further comprises an extended data management scheme comprising a plurality of market application specific project formats.

13. The system of claim 11, where a concrete automation model employs elements from multiple market application specific project formats.

14. The system of claim 11, further comprising a license manager configured to generate a feature matrix for dynamically enabling, disabling, showing, and hiding elements of the abstract automation model and concrete automation models according to licensing permissions.

15. The system of claim 12, further comprising a stencil editor configured to enable defining a custom shape that comprises a collection of a plurality of functions of the abstract automation model or concrete automation models.

16. The system of claim 15, where the plurality of functions are programmed in a plurality of control system languages.

17. An non-transitory computer-readable medium having instructions stored thereon that, in response to execution, cause at least one device to perform operations for providing automation collaborative framework system, the operations comprising:
defining an abstract automated model, where the abstract automation model defines an abstract data management scheme comprising a plurality of generic data objects; and
linking a plurality of concrete automated models, wherein each of the plurality of concrete automation models are respectively generated from vendor specific programming interface of a plurality of vendor specific programming interfaces, wherein the respective concrete automation models provide data interfaces from vendor specific programming data objects to generic data objects of the abstract automation model.

18. The non-transitory computer-readable medium of claim 17, the operations further comprising extending the abstract automation model to include an extended data management scheme comprising a plurality of market application specific project formats.

19. The non-transitory computer-readable medium of claim 17, wherein a concrete automation model employs elements from multiple market application specific project formats.

20. The non-transitory computer-readable medium of claim 17, the operations further comprising generating a feature matrix for dynamically enabling, disabling, showing, and hiding elements of the abstract automation model and concrete automation models according to licensing permissions.

* * * * *